March 5, 1957  C. G. LIFKA  2,784,010
CONNECTOR MEANS FOR FLEXIBLE CONDUIT
Filed March 14, 1955
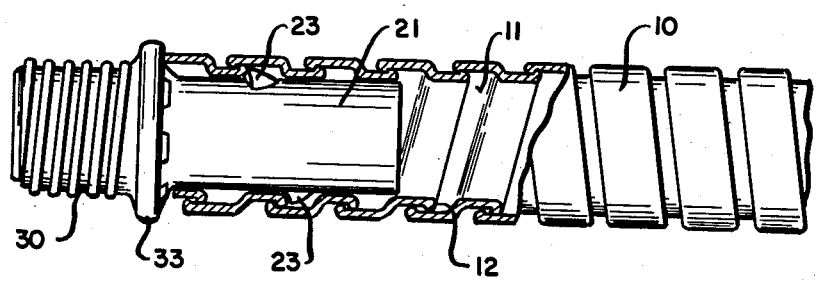
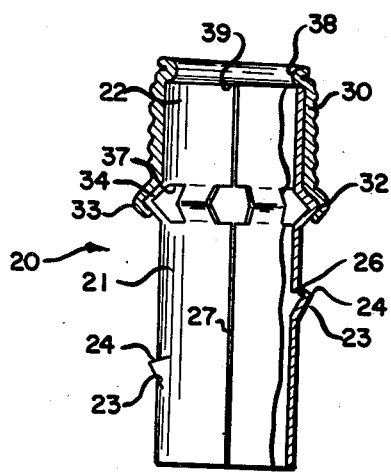
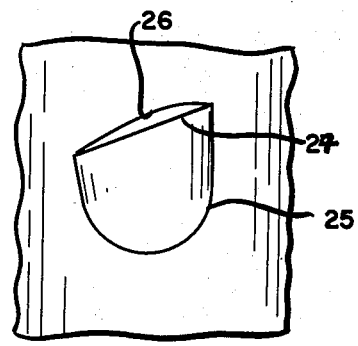
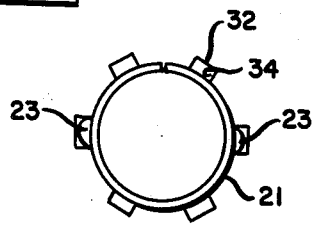
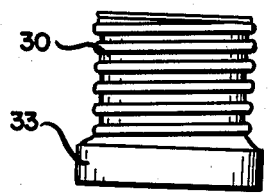
INVENTOR.
CHARLES G. LIFKA
BY Cullen & Cantor
ATTORNEY

United States Patent Office 2,784,010
Patented Mar. 5, 1957

2,784,010

CONNECTOR MEANS FOR FLEXIBLE CONDUIT

Charles G. Lifka, Detroit, Mich.

Application March 14, 1955, Serial No. 493,864

1 Claims. (Cl. 285—161)

This application relates to connectors for flexible conduit and particularly for flexible conduit of the type known to the trade as "Greenfield" and characterized by the fact that the conduit comprises a ribbed or ridged strip helically wound to provide a helical groove in the interior of the conduit whose turns are separated by a helical ridge.

An object of the present invention is to provide a connector means for anchoring itself to an end of such conduit merely by being threaded into such end and to serve as a means for securing such end of the conduit, once the connector means is anchored to the conduit, to any associated member such as an outlet box or a conduit fitting.

A more specific object of the present invention is to form such connector means in the main from a thin wall sheet material tubular sleeve preferably initially of flat stock, rolled into a tube.

In the preferred form the sleeve has stamped-out lugs positioned to interlock with the helical ridge of the conduit to anchor the sleeve and the connector means as a whole to the conduit in a satisfactory manner.

Other objects and advantages of this invention will become apparent upon reading the following description of which the attached drawings form a part.

Referring to the drawings, in which—

Fig. 1 is a view of the connector mounted within a flexible conduit with a portion of the conduit cut away for illustration purposes.

Fig. 2 is a view of the connector but with the ferrule shown in cross-section.

Fig. 3 is a bottom end view of the sleeve seen in Fig. 2.

Fig. 4 is an illustration of a fragment of the sleeve to an enlarged scale to specifically illustrate one form of lug.

Fig. 5 is a front view of the ferrule, per se, before mounting the ferrule upon the sleeve.

Referring to the drawing, it will be observed that the flexible conduit known to the trade as "Greenfield" and shown therein and referenced 10 is made up of a strip of ridged sheet metal helically wound to provide a helical groove 11 in the interior of the conduit whose turns are separated by a helical ridge 12 with whose edges lugs of the sleeve cooperate in a manner that will now be described.

The connector means 20 comprises a thin wall sheet material tubular sleeve 21 formed to fit inside the conduit with an end 22 projecting forwardly beyond an end of the conduit. The sleeve has stamped-out lugs 23 angularly and longitudinally spaced as indicated in the drawing in position to interlock with the helical ridge 12 by engagement with the helical edges of such ridge of the conduit.

Each lug 23 is struck out of the sleeve and has a forward transverse edge 24 for cooperation with the ridge. Each lug is of rounded U form with all of the edge 25 of the lug other than the forward transverse edge 24 being unseparated from the sleeve. The forward transverse edge of the lug is laterally humped and separated from the sleeve by a slit 26 and projects radially outwardly from the sleeve.

In the preferred form there are two lugs 180° apart and spaced longitudinally from each other one turn of the helical ridge of the conduit.

The forward transverse edge 24 of each lug 23 is at an oblique angle as shown to the longitudinal axis of the sleeve.

Each lug slopes downwardly and rearwardly from the transverse forward edge 24. The sleeve is made of a flat strip of sheet metal or the like rolled into a tube split at 27 and the lugs are stamped out of the sleeve.

Means are provided on the projecting end 22 of the sleeve for securing it and the conduit secured to it by cooperation of the lugs in the ridge to any associated member such as an outlet box or a conduit fitting. Such means comprises an externally threaded sheet metal ferrule 30 into which the forward end 22 of the sleeve is telescoped with the sleeve having an annular ridge 32 between its ends. The rear edge 33 of the ferrule is crimped over the annular ridge of the sleeve to interlock the sleeve and the ferrule.

The ferrule is of sheet metal and in the preferred form the threads are rolled into the ferrule in any suitable manner.

The rear end 21 of the sleeve is of smaller diameter than the forward end 22 of the sleeve and the forward part of the rear end of the sleeve is flared outwardly as at 34 toward the annular ridge 32 of the sleeve as shown and such flared out part is provided with slots 37 which facilitate forming the sleeve by a stamping operation from flat sheet metal stock where the parts are of different diameter as shown and with an annular ridge between the forward and rear ends of the sleeve.

The lugs 23 interlock with the ridge of the conduit at the edges of the ridge and will lock the sleeve to the conduit end hand tight so that the sleeve will not back off from the conduit and so as to be non-removable in ordinary use.

The lugs are spaced apart longitudinally and axially and the forward edges of the lugs are at oblique angles whereby the lugs conform to the helical formation of the conduit.

It is to be noted that the sleeve is extremely thin and hence does not reduce the internal diameter of the conduit materially, thus, not depriving the interior of the conduit of cross-sectional area needed for free pulling of wires in the conduit or raceway to any material extent.

It is to be noted also that the forward edge 38 of the ferrule is rolled and rounded as shown over the forward edge 39 of the sleeve to prevent the exposure of a sharp cutting edge on the connector and thus to prevent cutting of the insulation of wires inside the conduit as such wires are drawn through or pulled through the conduit.

Now having described the connector means for flexible conduits herein disclosed reference should be had to the claim which follows:

What is claimed is:

Connector means for flexible conduit of the type known to the trade as "Greenfield" and characterized by the fact that it is a ridged strip helically wound to provide a helical groove in the interior of the conduit whose turns are separated by a helical ridge, the connector means comprising a thin walled sheet metal tubular sleeve formed to fit inside the conduit when threaded into its end with an end projecting forwardly beyond an end of the conduit, said sleeve having two stamped out lugs 180 degrees apart angularly and longitudinally spaced in position to interlock into the helical groove and with the helical ridge, each lug being struck out of the sleeve and having a forward transverse edge for cooperation with said ridge, each lug being of U form, the forward transverse edge being laterally humped and projecting radially outwardly from the sleeve, and means on the projecting end of the sleeve for securing it and a conduit secured thereto by the cooperation of the lugs and the ridge to any associated member, all of the edges of the lug other than the forward edge being unseparated from the sleeve, the forward edge being separated from the sleeve by a slit, the forward transverse edge of each lug being at an oblique angle to the longitudinal axis of the sleeve, each lug sloping downwardly and rearwardly from the transverse forward edge, the sleeve being a flat strip rolled into a tube, each lug being of rounded U form, said means comprising an externally threaded sheet metal hollow ferrule into which the forward end of the sleeve is telescoped, the sleeve having an annular ridge between its ends, with the rear edge of the ferrule being crimped over said annular ridge to interlock the sleeve and ferrule.

References Cited in the file of this patent
UNITED STATES PATENTS

| | | |
|---|---|---|
| 1,473,362 | Tilton | Nov. 6, 1923 |
| 1,830,276 | Hunter | Nov. 3, 1931 |
| 2,426,332 | Acres | Aug. 26, 1947 |
| 2,594,027 | Jakeway | Apr. 22, 1952 |